Aug. 27, 1940.    L. R. JOHNSON    2,212,741
CONVERTIBLE VEHICLE
Filed Nov. 9, 1938
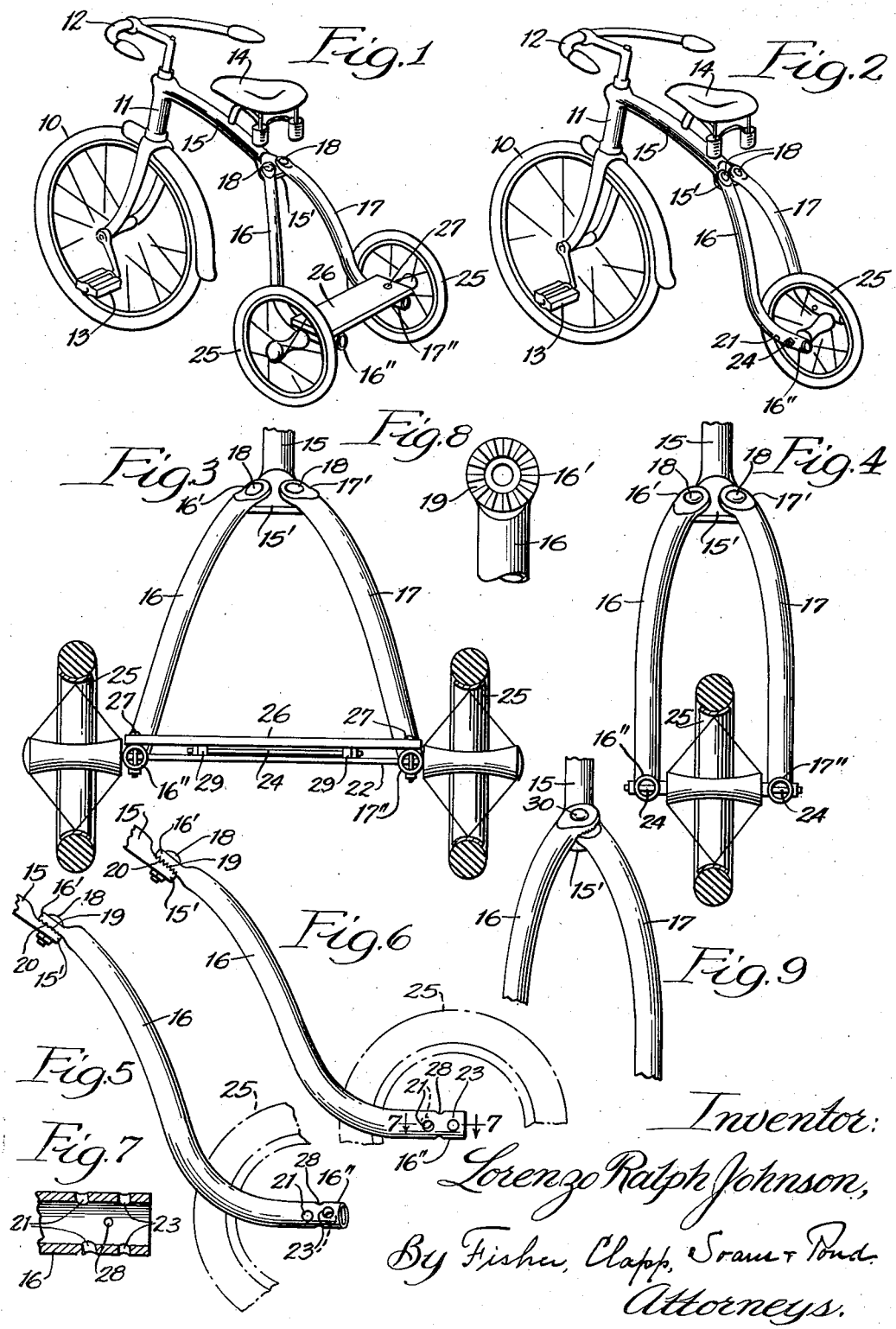

Patented Aug. 27, 1940

2,212,741

UNITED STATES PATENT OFFICE 2,212,741

CONVERTIBLE VEHICLE

Lorenzo Ralph Johnson, Cleveland, Okla.

Application November 9, 1938, Serial No. 239,635

1 Claim. (Cl. 280—7.10)

This invention relates to vehicles, more particularly those designed for the use of young children. The type of rider-propelled vehicle to which a child of two to five years of age is first introduced is usually the three-wheeler or tricycle, having the cranks and pedals applied to the front or steering wheel. This gives him pedal practice, but does not require balancing. As the child grows older and outgrows his tricycle, he next wants a two-wheeler or bicycle with the same pedal drive on the front wheel. And from this latter he graduates to the modern chain and sprocket drive bicycle.

The general object of this invention is to provide an improved structure of child's vehicle which shall be readily convertible between a tricycle and a bicycle, so that the youngster can first use it as a tricycle, later convert it into a bicycle, and still later, when his younger brother reaches the age to desire such a plaything, reconvert it back into a tricycle.

In accordance with the present invention, the conversion is made possible by pivotally connecting the two limbs of the forked lower rear portion of the back bone of the frame to the upper saddle-supporting portion, so that the two limbs can be spread to take a relatively long axle in the tricycle form and narrowed to take a relatively short axle in the bicycle form; means being provided to securely clamp the upper ends of the limbs of the fork rigid in either adjusted position. Preferably also a step plate bolted at its ends to and across the lower end portions of the limbs of the fork is provided for the tricycle form, and this step plate may be provided with means for carrying a short axle not used in the tricycle form but substituted for the long axle in the bicycle form.

A practical embodiment of the invention is illustrated in the accompanying drawing, in which—

Fig. 1 is a perspective view of the convertible vehicle in tricycle form.

Fig. 2 shows in perspective the tricycle of Fig. 1 converted into a bicycle.

Fig. 3 is an enlarged rear elevation of the portion of Fig. 1 behind the saddle, the tires of the rear wheels appearing in cross-section.

Fig. 4 is a similar enlarged rear elevation of the portion of Fig. 2 behind the saddle.

Fig. 5 is an outer side elevation of the left limb of the fork as it appears in the Fig. 3 position.

Fig. 6 is an outer side elevation of the same limb as it appears in the Fig. 4 position.

Fig. 7 is an enlarged fragmentary longitudinal section taken on the line 7—7 of Fig. 6.

Fig. 8 is a fragmentary bottom plan view of the pivoted upper end portion of a limb of the fork, showing a toothed formation that cooperates with a similar toothed formation on the saddle-supporting portion of the back-bone and with the pivot bolt to lock the limb against lateral displacement from its adjusted position.

Fig. 9 is a fragmentary rear elevation, similar to Fig. 4, but showing a modification wherein the upper ends of the limbs of the fork are overlapped and secured to the upper portion of the back-bone by a single bolt.

The front wheel 10, forked post 11, handle bar 12, pedals 13 and saddle 14 are, or may be, all as usual in a well known form of child's tricycle.

The rear frame member or "back-bone" of the vehicle has a single upper or forward portion 15 that supports the saddle 14, and a lower rear forked portion comprising left and right (viewed from the rear) limbs 16 and 17. These frame members may be tubular, as indicated, and the rear end of the member 15 is flattened and widened as shown at 15', and formed with laterally spaced bolt holes. The upper end of each limb of the fork is also flattened and widened as shown at 16' and 17' and formed with a central bolt hole that registers with one of the holes in the flattened rear end 15'. Through these registering holes are passed pivot bolts 18. As shown in Figs. 5, 6 and 8, the under surface of each pivoted end is formed with a circular row of ratchet teeth 19 that cooperate with a similar row of ratchet teeth 20 on the flattened end 15' to lock the limb in adjusted position when the nuts of bolts 18 are tightened.

As best shown in Figs. 5 and 6, the lower portions 16" and 17" of the limbs 16 and 17 extend rearwardly substantially horizontally, and through these horizontal end portions are holes 21 to receive a long rear axle 22 of the tricycle, and holes 23 to receive a short rear axle 24 of the bicycle. Since in the tricycle assembly the fork limbs intersect the axle at an acute angle on their inner sides and an obtuse angle on their outer sides (see Fig. 3), and in the bicycle assembly they intersect the axle at right angles, and since the swing of the limb is also in an inclined (and not in a horizontal) plane, the two axle holes lie at a slight angle to each other both horizontally and vertically. The long axle 22 projects beyond the fork limbs 16 and 17 and on its projecting ends are mounted the hubs of the rear wheels 25.

A step plate 26 rests at its ends on and across the horizontal end portions 16" and 17" of the fork limbs and is secured thereto by bolts 27 which pass through vertical holes 28 (Fig. 7) located between the holes 21 and 23. On the under side of the step plate 26 are apertured lugs 29 that support and store the short axle 24, so that the latter is always conveniently at hand whenever it is desired to convert the vehicle from a three-wheeler to a two-wheeler.

Fig. 9 shows a slight modification in the connection of the fork limbs 16 and 17 to the backbone member 15. The flattened upper end portions are overlapped, and a single pivot bolt 30 connects them to each other and connects both to the flattened rear end of member 15. In this construction the contacting surfaces are all formed with a ring of ratchet teeth like 19 and 20 encircling the bolt hole, as will be readily understood, so that, when the nut of the pivot bolt 30 is tightened, the three overlapped parts are all locked in rigid relation to each other.

The tricycle may be converted to a bicycle by the following operations.

The wheels 25 are first withdrawn, then the long axle 22. The step-plate 26 is removed by first withdrawing the bolts 27, bringing with it the short axle 24. The bolts 18 (or single bolt 30) are next sufficiently backed off to free the ratchet teeth from each other, and the fork limbs 16 and 17 are then swung inwardly to the narrowed position shown in Fig. 4. The short axle 24 is removed from its storage on step-plate 26, entered through the hub of one of the wheels 25, and its ends are then engaged with the holes 23. The bolts 18 (or 30) are then tightened.

Substantially the reverse of these operations performed in substantially the inverse order converts the bicycle into a tricycle. The short axle 24 is withdrawn, and this frees the rear wheel 25. The bolts 18 (or 30) are loosened, the arms 16 and 17 are spread, the long axle 22 is entered through the holes 21, the wheels 25 are applied to the projecting ends of the axle, the bolts 18 (or 30) are tightened, the short axle 24 is mounted on the step-plate 26, and the latter is then secured in place by the bolts 27.

Variations and modifications within the scope of the claim may be resorted to without departing from the substance of the invention or sacrificing any of the advantages thereof.

I claim:

In a tricycle of the convertible type, the combination of a frame formed with a forward saddle supporting portion and a forked rear portion, the limbs of the forked portion being pivoted on the rear end of said saddle supporting portion so as to be adjustable between a spread position and a narrowed position, said limbs having one set of bearings for supporting them on an axle in their spread position, means for securing said limbs in either position, a relatively long rear axle engaged with said one set of axle supporting bearings and projecting laterally beyond the lower ends of said limbs when the latter are in their spread position, and wheels journaled on the projecting ends of said long axle, said limbs having a second set of bearings which are aligned when the limbs are in narrowed position whereby an axle may be received in said second set of bearings.

LORENZO RALPH JOHNSON.